(12) United States Patent
Kim

(10) Patent No.: US 10,921,190 B2
(45) Date of Patent: Feb. 16, 2021

(54) SPECTRUM MEASURING APPARATUS AND SPECTRUM MEASURING METHOD

(71) Applicant: SAMSUNG ELECTRONICS CO., LTD., Suwon-si (KR)

(72) Inventor: Sang Kyu Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/531,272

(22) Filed: Aug. 5, 2019

(65) Prior Publication Data
US 2020/0049561 A1 Feb. 13, 2020

(30) Foreign Application Priority Data
Aug. 8, 2018 (KR) .................. 10-2018-0092172

(51) Int. Cl.
*G01J 3/457* (2006.01)
*G01J 3/10* (2006.01)
*G01J 3/42* (2006.01)

(52) U.S. Cl.
CPC .............. *G01J 3/457* (2013.01); *G01J 3/10* (2013.01); *G01J 3/42* (2013.01); *G01J 2003/102* (2013.01)

(58) Field of Classification Search
CPC ........... G01J 3/457; G01J 3/42; G01N 21/359
See application file for complete search history.

(56) References Cited

U.S. PATENT DOCUMENTS

| | | | |
|---|---|---|---|
| 9,316,539 | B1 | 4/2016 | Phua |
| 9,360,366 | B1 | 6/2016 | Tran |
| 9,395,244 | B2 | 7/2016 | Kurokawa et al. |
| 9,593,982 | B2 | 3/2017 | Rhoads et al. |
| 9,933,305 | B2 | 4/2018 | Goldring et al. |
| 10,140,952 | B1* | 11/2018 | Letourneur ............... G09G 5/10 |
| 2007/0085926 | A1* | 4/2007 | Yuyama ............... H04N 5/2354 348/370 |
| 2008/0174768 | A1 | 7/2008 | Belz |
| 2009/0078860 | A1* | 3/2009 | Kischkat ................ G01N 21/31 250/269.1 |
| 2016/0109371 | A1 | 4/2016 | Blair |
| 2016/0127661 | A1 | 5/2016 | Hegyi et al. |
| 2017/0364046 | A1* | 12/2017 | Westrick, Jr. .......... H05B 47/18 |
| 2018/0020956 | A1 | 1/2018 | Lee et al. |
| 2018/0020958 | A1 | 1/2018 | Lee et al. |
| 2018/0035941 | A1 | 2/2018 | Shin et al. |

FOREIGN PATENT DOCUMENTS

KR 10-1557769 B1 10/2015

* cited by examiner

*Primary Examiner* — Maurice C Smith
(74) *Attorney, Agent, or Firm* — Sughrue Mion, PLLC

(57) ABSTRACT

A spectrum measuring apparatus includes a plurality of light sources configured to emit light of different wavelengths onto an object, based on current at various intensities that is applied to each of the plurality of light sources, a photodetector configured to receive light that is one among reflected from, scattered from, and transmitted into the object onto which the light is emitted, and measure an intensity of the received light, and a processor configured to obtain spectrum of the object, based on the measured intensity of the received light.

13 Claims, 9 Drawing Sheets

SPECTRUM MEASURING APPARATUS AND SPECTRUM MEASURING METHOD

CROSS-REFERENCE TO RELATED APPLICATION

This application claims priority from Korean Patent Application No. 10-2018-0092172, filed on Aug. 8, 2018, in the Korean Intellectual Property Office, the entire disclosure of which is incorporated herein by reference for all purposes.

BACKGROUND

1. Field

Apparatuses and methods consistent with embodiments relate to technology for measuring spectrum, and more particularly to an apparatus and a method for measuring spectrum of an object by applying current at various intensities.

2. Description of the Related Art

Absorbance is used to analyze samples in various applications such as environment monitoring, food inspection, medical diagnosis, and the like. Research is constantly conducted to obtain various types of bio-information by continuously measuring skin absorbance with a small spectrometer and by analyzing the measurements.

To provide a small spectrometer, the number of elements in the spectrometer may be reduced. To this end, research has been conducted to measure skin spectrum accurately by using a small number of light sources.

SUMMARY

According to embodiments, there is provided a spectrum measuring apparatus including a plurality of light sources configured to emit light of different wavelengths onto an object, based on current at various intensities that is applied to each of the plurality of light sources, a photodetector configured to receive light that is one among reflected from, scattered from, and transmitted into the object onto which the light is emitted, and measure an intensity of the received light, and a processor configured to obtain spectrum of the object, based on the measured intensity of the received light.

The photodetector may be further configured to amplify the received light, based on a predetermined gain.

The spectrum measuring apparatus may further include a driving current controller configured to control the various intensities of the current applied to each of the plurality of light sources, based on a control signal that is received from the processor.

The processor may be further configured to adjust a gain of the photodetector so that the photodetector is not saturated.

The processor may be further configured to identify whether the photodetector is saturated, based on the measured intensity of the received light, and based on the photodetector being identified to be saturated, adjust the gain of the photodetector.

The processor may be further configured to obtain the spectrum of the object by reconstructing the spectrum based on the measured intensity of the received light and a light source spectrum.

The light source spectrum may be a spectrum of light that is emitted by each of the plurality of light sources when the current at the various intensities is applied to each of the plurality of light sources.

The processor may be further configured to obtain the light source spectrum from an internal or external database, or by applying the current at the various intensities to each of the plurality of light sources and measuring an intensity of the light emitted by the plurality of light sources.

According to embodiments, there is provided a spectrum measuring method including applying current at various intensities to each of a plurality of light sources to emit light of different wavelengths onto an object, receiving, by a photodetector, light that is one among reflected from, scattered from, and transmitted into the object onto which the light is emitted, measuring, by the photodetector, an intensity of the received light, and obtaining spectrum of the object, based on the measured intensity of the received light.

The spectrum measuring method may further include adjusting a gain of a photodetector so that the photodetector is not saturated.

The adjusting of the gain of the photodetector may include identifying whether the photodetector is saturated, based on the measured intensity of the received light, and based on the photodetector being identified to be saturated, adjusting the gain of the photodetector.

The obtaining of the spectrum of the object may include obtaining the spectrum of the object by reconstructing the spectrum based on the measured intensity of the received light and a light source spectrum, and the light source spectrum may be a spectrum of light that is emitted by each of the plurality of light sources when the current at the various intensities is applied to each of the plurality of light sources.

The spectrum measuring method may further include obtaining the light source spectrum.

The obtaining of the light source spectrum may include obtaining the light source spectrum from an internal or external database, or by applying the current at the various intensities to each of the plurality of light sources and measuring an intensity of the light emitted by the plurality of light sources.

According to embodiments, there is provided a component analyzing apparatus including a spectrum measurer configured to obtain spectrum of an object, and a first processor configured to analyze a component of the object by analyzing the obtained spectrum of the object. The spectrum measurer may include a plurality of light sources configured to emit light of different wavelengths onto the object, based on current at various intensities that is applied to each of the plurality of light sources, a photodetector configured to receive light that is one among reflected from, scattered from, and transmitted into the object onto which the light is emitted, and measure an intensity of the received light, and a second processor configured to obtain the spectrum of the object, based on the measured intensity of the received light.

DETAILED DESCRIPTION

Figure 1:
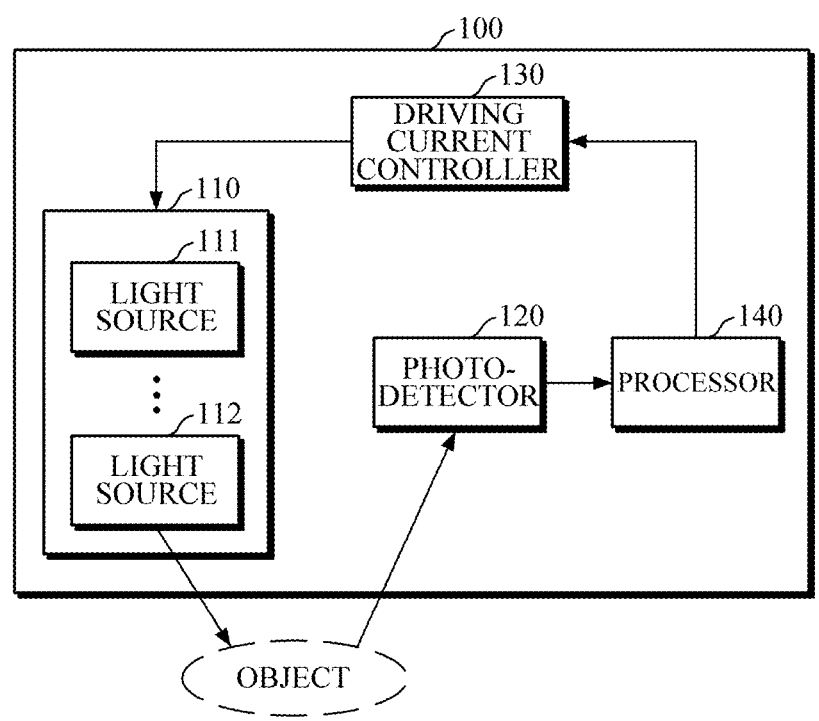
FIG. 1 is a block diagram illustrating an example of a spectrum measuring apparatus, according to embodiments.

Hereinafter, embodiments of the disclosure will be described in detail with reference to the accompanying drawings. It may be noted that, in the drawings, the same reference symbols refer to same parts although illustrated in other drawings. In the following description, a detailed description of known functions and configurations incorporated herein will be omitted when it may obscure the subject matter of the embodiments.

Process steps described herein may be performed differently from a specified order, unless a specified order is clearly stated in the context of the disclosure. That is, each step may be performed in a specified order, at substantially the same time, or in a reverse order.

Further, the terms used throughout this specification are defined in consideration of the functions according to the embodiments, and can be varied according to a purpose of a user or manager, or precedent and so on. Therefore, definitions of the terms may be made on the basis of the overall context.

It will be understood that, although the terms first, second, etc. may be used herein to describe various elements, these elements may not be limited by these terms. These terms are only used to distinguish one element from another. Any references to singular may include plural unless expressly stated otherwise. In the present specification, it may be understood that the terms, such as 'including' or 'having,' etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Further, components that will be described in the specification are discriminated according to functions mainly performed by the components. That is, two or more components that will be described later can be integrated into a single component. Furthermore, a single component that will be explained later can be separated into two or more components. Moreover, each component that will be described can additionally perform some or all of a function executed by another component in addition to the main function thereof. Some or all of the main function of each component that will be explained can be carried out by another component. Each component may be implemented in hardware or software, or a combination thereof.

FIG. 1 is a block diagram illustrating an example of a spectrum measuring apparatus 100, according to embodiments.

The spectrum measuring apparatus 100 is an apparatus capable of measuring a spectrum of an object by using an LED-PD embedded in an electronic device, and may be mounted in an electronic device. In this case, examples of the electronic device may include a cellular phone, a smartphone, a tablet PC, a laptop computer, a personal digital assistant (PDA), a portable multimedia player (PMP), a navigation, an MP3 player, a digital camera, a wearable device, and the like; and examples of the wearable device may include a wristwatch-type wearable device, a wristband-type wearable device, a ring-type wearable device, a waist belt-type wearable device, a necklace-type wearable device, an ankle band-type wearable device, a thigh band-type wearable device, a forearm band-type wearable device, and the like. However, the electronic device is not limited thereto, and the wearable device is neither limited thereto.

Referring to FIG. 1, the spectrum measuring apparatus 100 includes a light source part 110, a photodetector 120, a driving current controller 130, and a processor 140.

The light source part 110 may emit light onto an object. The light source part 110 may include a plurality of light sources 111 and 112 that emit light of different wavelengths onto an object. In embodiments, each of the light sources 111 and 112 may emit visible light or near-infrared light of different wavelengths onto an object. However, the wavelengths of light emitted by each of the light sources 111 and 112 may vary depending on the purpose of measurement or types of components to be analyzed. Further, each of the light sources 111 and 112 is not necessarily a single light emitting body, and may be an array of a plurality of light emitting bodies. In embodiments, each of the light sources 111 and 112 may include a light-emitting diode (LED), a laser diode, or the like, but this is an example and the light sources 111 and 112 are not limited thereto.

A peak wavelength and an amount of light of the light sources 111 and 112 may be controlled according to the intensity of current applied to each of the light sources 111 and 112. For example, as the intensity of current applied to each of the light sources 111 and 112 is increased, the amount of light emitted by the light sources 111 and 112 is increased, and the peak wavelength of the light sources 111 and 112 is shifted.

In addition, the light source part 110 may further include at least one optical element (e.g., mirror, etc.) for directing light, emitted by the light sources 111 and 112, toward a desired position of an object.

The photodetector 120 may receive light reflected or scattered from, or transmitted into, an object among the light beams emitted by the light sources 111 and 112, and may measure the intensity of the received light. In this case, the photodetector 120 may amplify the received light according to a predetermined gain. In embodiments, the photodetector 120 may include a photo diode, a photo transistor (PTr), a charge-coupled device (CCD), and the like. The photodetector 120 is not necessarily a single device, but may be an array of a plurality of devices.

In addition, the photodetector 120 may further include at least one optical element (e.g., mirror, etc.) for directing light, reflected or scattered from or transmitted into the object, toward the photodetector 120.

The driving current controller 130 may control a peak wavelength and an amount of light emitted by the light sources 111 and 112 by controlling the intensity of current applied to each of the light sources 111 and 112 according to a control signal of the processor 140.

The processor 140 may control the overall operation of the spectrum measuring apparatus 100.

The processor 140 may control the driving current controller 130 to apply current at various intensities to each of the light sources 111 and 112. For example, the processor 140 may apply current to the light sources 111 and 112 by increasing the current from 1 mA to 200 mA by a predetermined value. In this case, the starting current of 1 mA and the ending current of 200 mA are examples, and the current value is not limited thereto.

Further, the predetermined value may be set to various values according to performance and purpose of use of a system.

The processor 140 may adjust the gain of the photodetector 120 so that the photodetector 120 may not be saturated. As the intensity of current applied to the light sources 111 and 112 is increased, the amount of light emitted by the light sources 111 and 112 is also increased. In addition, the light intensity, which may be measured by the photodetector 120, is limited, such that in the case in which the intensity of light received by the photodetector 120 is equal to or greater than a predetermined range, the photodetector 120 may be saturated. Accordingly, in embodiments, the processor 140 may determine whether the photodetector 120 is saturated based on the measured intensity of the photodetector 120, which is measured by applying current at various intensities to the light sources 111 and 112; and upon determining that the photodetector 120 is saturated, the processor 140 may adjust the gain of the photodetector 120.

The processor 140 may obtain the spectrum of an object based on the measured intensity of the photodetector 120 that is measured by applying current at various intensities to the light sources 111 and 112. In embodiments, the processor 140 may obtain the spectrum of the object by reconstructing the spectrum based on the measured intensity of the photodetector 120, which is measured by applying current at various intensities to the light sources 111 and 112, and a light source spectrum. In this case, the light source spectrum is the spectrum of light emitted by each of the light sources 111 and 112 when current at various intensities is applied to the light sources 111 and 112. The processor 140 may obtain information on the light source spectrum from an internal or external database in which the information on the light source spectrum may be pre-stored, or the processor 140 may obtain the information on the light source spectrum by controlling the driving current controller 130 to apply current at various intensities to the light sources 111 and 112, and by measuring the intensity of light emitted by the light sources 111 and 112 according to the applied current at various intensities.

In embodiments, the processor 140 may obtain the spectrum of an object by using the following Equation 1.

$$R=[S_i \times S_{PD}]^{-1} \times M_{PD}$$ [Equation 1]

Herein, denotes the spectrum of an object, $S_i$ denotes the light source spectrum, denotes the sensitivity of the photodetector for each wavelength, and $M_{PD}$ denotes the measured intensity of the photodetector.

Further, in embodiments, the processor 140 may control the driving current controller 130 to apply current at various intensities to each of the light sources 111 and 112 by considering the current intensity at which the photodetector 120 is not saturated. For example, assuming that the photodetector 120 is saturated when the current of 300 mA is applied to the light source 111, the processor 140 may control the driving current controller 130 to apply current to the light source 111 by increasing current from 1 mA to 300 mA by a predetermined value. Further, assuming that the photodetector 120 is saturated when the current of 250 mA is applied to the light source 112, the processor 140 may control the driving current controller 130 to apply current to the light source 111 by increasing current from 1 mA to 250 mA by a predetermined value. In this case, information on the current applied to each of the light sources 111 and 112 may be measured in advance and may be stored in an internal or external database.

In addition, the light source part 110 and the photodetector 120 may be components already provided in an electronic device in which the spectrum measuring apparatus 100 is mounted. That is, in embodiments, the spectrum measuring apparatus 100 may measure spectrum by using the light source part 110 and the photodetector 120, which are already provided in the electronic device in which the spectrum measuring apparatus 100 is mounted, without additionally using a separate light source part 110 and a separate photodetector 120.

Figure 2:
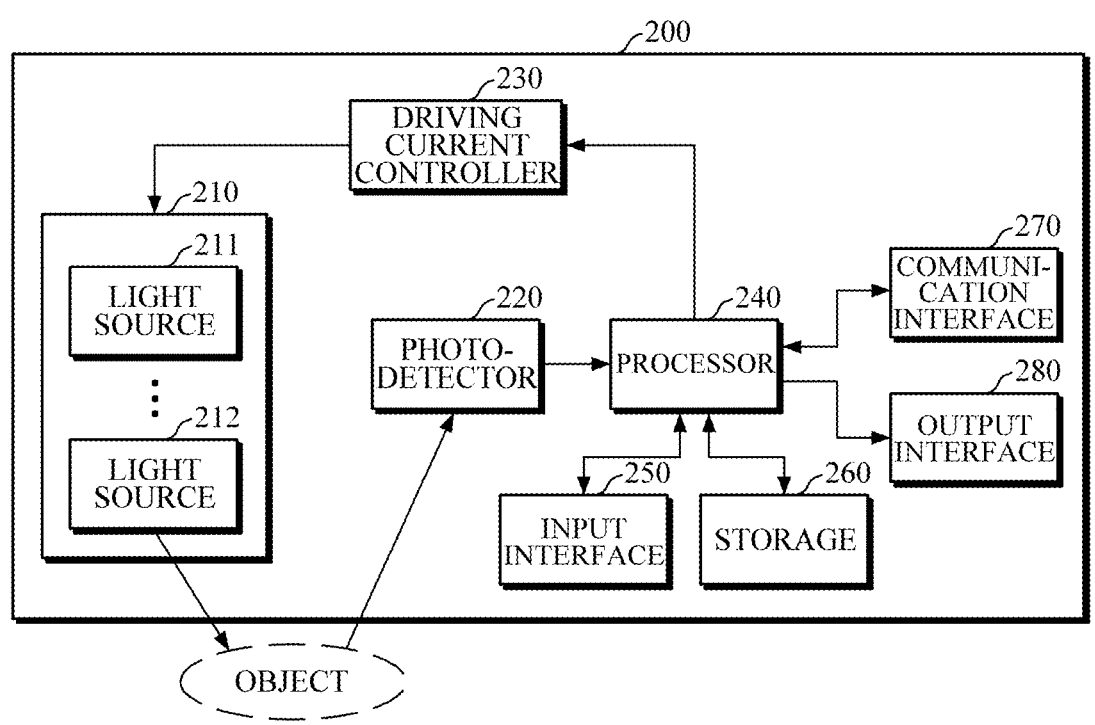
FIG. 2 is a block diagram illustrating another example of a spectrum measuring apparatus, according to embodiments.

FIG. 2 is a diagram illustrating another example of a spectrum measuring apparatus 200, according to embodiments.

The spectrum measuring apparatus 200 may be embedded in an electronic device. In this case, examples of the electronic device may include a cellular phone, a smartphone, a tablet PC, a laptop computer, a personal digital assistant (PDA), a portable multimedia player (PMP), a navigation, an MP3 player, a digital camera, a wearable device, and the like; and examples of the wearable device may include a wristwatch-type wearable device, a wristband-type wearable device, a ring-type wearable device, a waist belt-type wearable device, a necklace-type wearable device, an ankle band-type wearable device, a thigh band-type wearable device, a forearm band-type wearable device, and the like. However, the electronic device is not limited thereto, and the wearable device is neither limited thereto.

Referring to FIG. 2, the spectrum measuring apparatus 100 includes a light source part 210, a photodetector 220, a driving current controller 230, a processor 240, an input interface 250, a storage 260, a communication interface 270, and an output interface 280. Here, the light source part 210, the photodetector 220, the driving current controller 230, and the processor 240 are the same as the light source part 110, the photodetector 120, the driving current controller 130, and the processor 140 of FIG. 1, such that the detailed description thereof will be omitted.

The input interface 250 may receive input of various operation signals from a user. In embodiments, the input interface 250 may include a keypad, a dome switch, a touch pad (a resistive type, a capacitive type, an electromagnetic resonance type, an active electrostatic type, etc.), a jog wheel, a jog switch, a hardware (H/W) button, and the like. The touch pad, which forms a layer structure with a display, may be called a touch screen.

The storage 260 may store programs or instructions for operation of the spectrum measuring apparatus 200, and may store data input to and output from the spectrum measuring apparatus 200. Further, the storage 260 may store data processed by the spectrum measuring apparatus 200, and data for data processing of the spectrum measuring apparatus 200.

The storage 260 may include at least one storage medium of a flash memory type memory, a hard disk type memory, a multimedia card micro type memory, a card type memory (e.g., an SD memory, an XD memory, etc.), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disk, and an optical disk, and the like. Further, the spectrum measuring apparatus 200 may operate an external storage medium, such as web storage and the like, which performs a storage function of the storage 260 on the Internet.

The communication interface 270 may perform communication with an external device. For example, the communication interface 270 may transmit, to the external device, data used by the spectrum measuring apparatus 200, processing result data of the spectrum measuring apparatus 200, and the like; or may receive, from the external device, various data for measuring spectrum of an object.

In this case, the external device may be medical equipment using the data used by the spectrum measuring apparatus 200 or the processing result data of the spectrum measuring apparatus 200, a printer to print out results, or a display to display the results. In addition, the external device may be a digital TV, a desktop computer, a cellular phone, a smartphone, a tablet PC, a laptop computer, a personal digital assistant (PDA), a portable multimedia player (PMP), a navigation, an MP3 player, a digital camera, a wearable device, and the like, but the external device is not limited thereto.

The communication interface 270 may communicate with an external device by using Bluetooth communication, Bluetooth Low Energy (BLE) communication, Near Field Communication (NFC), WLAN communication, Zigbee communication, Infrared Data Association (IrDA) communication, Wi-Fi Direct (WFD) communication, Ultra-Wideband (UWB) communication, Ant+ communication, WIFI communication, Radio Frequency Identification (RFID) communication, 3G communication, 4G communication, 5G communication, and the like. However, this is an example and is not intended to be limiting.

The output interface 280 may output the data used by the spectrum measuring apparatus 200, the processing result data of the spectrum measuring apparatus 200, and the like. In embodiments, the output interface 280 may output the data used by the spectrum measuring apparatus 200, the processing result data of the spectrum measuring apparatus 200, and the like by using any one or any combination of an acoustic method, a visual method, and a tactile method. To this end, the output interface 280 may include a display, a speaker, a vibrator, and the like.

Figure 3:
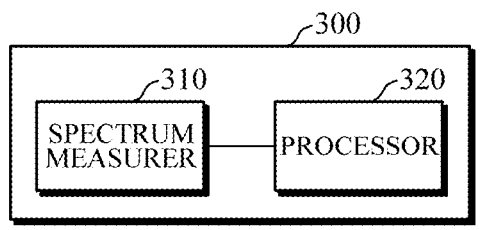
FIG. 3 is a block diagram illustrating an example of a component analyzing apparatus, according to embodiments.

FIG. 3 is a diagram illustrating an example of a component analyzing apparatus 300, according to embodiments.

The component analyzing apparatus 300 may be embedded in an electronic device. In this case, examples of the electronic device may include a cellular phone, a smartphone, a tablet PC, a laptop computer, a personal digital assistant (PDA), a portable multimedia player (PMP), a navigation, an MP3 player, a digital camera, a wearable device, and the like; and examples of the wearable device may include a wristwatch-type wearable device, a wristband-type wearable device, a ring-type wearable device, a waist belt-type wearable device, a necklace-type wearable device, an ankle band-type wearable device, a thigh band-type wearable device, a forearm band-type wearable device, and the like. However, the electronic device is not limited thereto, and the wearable device is neither limited thereto.

Referring to FIG. 3, the component analyzing apparatus 300 includes a spectrum measurer 310 and a processor 320. Here, the spectrum measurer 310 is the same as the spectrum measuring apparatuses 100 and 200 described above with reference to FIGS. 1 and 2, such that detailed description thereof will be omitted.

The processor 320 may analyze components of an object by analyzing spectrum of the object that is measured by the spectrum measurer 310, in which the components may vary depending on the types of object.

In embodiments, the processor 320 may analyze the components of the object by using an absorption spectrum analysis method.

The absorption spectrum analysis method may predict a component in such a manner that: after broadband light is emitted onto an object, light radiating from the object by diffused reflection is analyzed; and the amount of light absorbed into the component of the object is calculated.

The processor 320 may identify an object based on the analyzed component, and may determine physical properties of the identified object. The processor 320 may identify the object by using information on components for each type of object and information on a relationship between the amount of each component and physical properties, and may determine the physical properties of the identified object. In this case, the information on components for each type of object and the information on a relationship between the amount of each component and physical properties may be stored in an internal or external database.

The spectrum measurer 310 and the processor 320 may be connected by wire or wirelessly to each other. For example, the component analyzing apparatus 300 may be implemented in a small portable device in which the spectrum measurer 310 and the processor 320 are connected by wire. Alternatively, the processor 320 may be embedded in a mobile terminal, so that the processor 320 may communicate wirelessly with the spectrum measurer 310.

Figure 4:
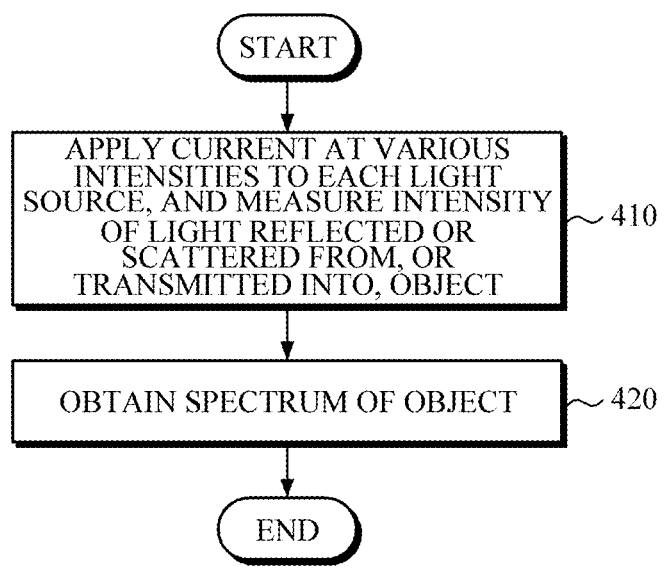
FIG. 4 is a flowchart illustrating an example of a spectrum measuring method, according to embodiments.

FIG. 4 is a diagram illustrating an example of a spectrum measuring method, according to embodiments. The spectrum measuring method of FIG. 4 may be a method performed by the spectrum measuring apparatuses 100 and 200 of FIGS. 1 and 2.

Referring to FIG. 4, the spectrum measuring apparatus may emit light onto an object by applying current at various intensities to each of a plurality of light sources that emit light of different wavelengths, and may measure the intensity of light reflected or scattered from, or transmitted into, the object in operation 410. In this case, each of the light sources emit visible light or near-infrared light of different wavelengths onto the object, and according to the intensity of the applied current, the amount of light emitted by the light sources may be increased or decreased and a peak wavelength of each of the light sources may be shifted. In embodiments, the spectrum measuring apparatus may apply a current to each of the light sources by increasing the current from 1 mA to 200 mA by a predetermined value. In this case, the starting current of 1 mA and the ending current of 200 mA are examples, and the current value is not limited thereto. Further, the predetermined value may be set to various values according to performance and purpose of use of a system.

The spectrum measuring apparatus may obtain spectrum of the object based on the measured intensity in operation 420, which is measured by applying current at various intensities to each of the light sources. In embodiments, the spectrum measuring apparatus may obtain the spectrum of the object by reconstructing the spectrum based on the measured intensity of the photodetector, which is measured by applying current at various intensities to each of the light sources, and the light source spectrum. In this case, the light source spectrum may be a spectrum of light emitted by each of the light sources when current at various intensities is applied to the light sources. In embodiments, the spectrum measuring apparatus may obtain the spectrum of the object by using Equation 1.

Figure 5:
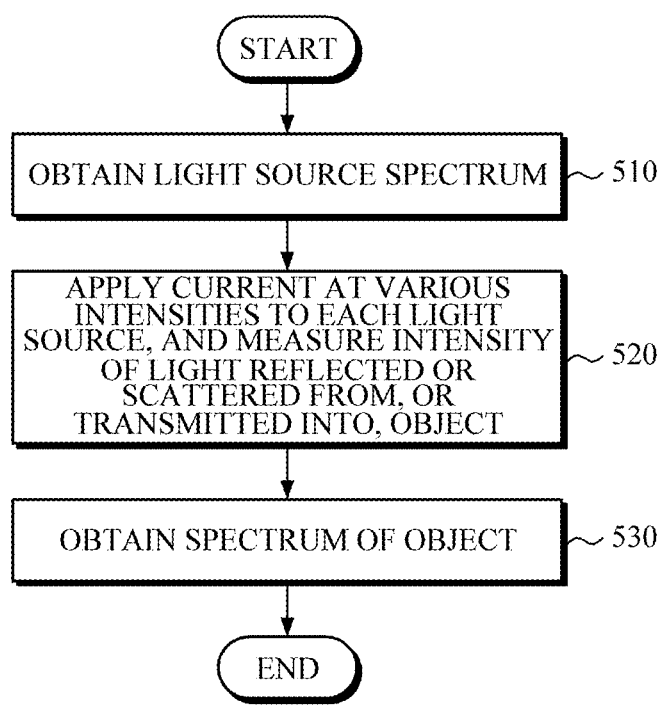
FIG. 5 is a flowchart illustrating another example of a spectrum measuring method, according to embodiments.

FIG. 5 is a diagram illustrating another example of a spectrum measuring method, according to embodiments. The spectrum measuring method of FIG. 5 may be a method performed by the spectrum measuring apparatuses 100 and 200 of FIGS. 1 and 2. Here, operations 520 and 530 are the same as the operations 410 and 420 respectively, such that detailed description thereof will be omitted.

Referring to FIG. 5, the spectrum measuring apparatus may obtain a light source spectrum in operation 510. For example, the spectrum measuring apparatus may obtain the light source spectrum from an internal or external database, or may obtain the light source spectrum by applying current at various intensities to each of the light sources and by measuring the intensity of light emitted by the light sources according to the applied current at various intensities.

Figure 6:
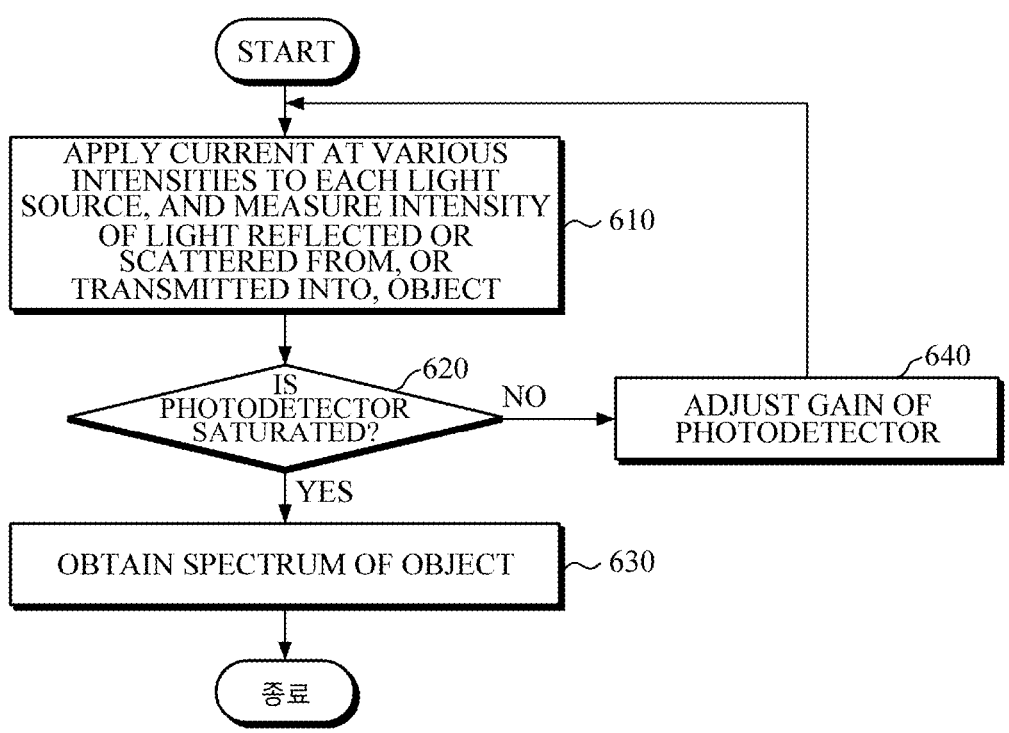
FIG. 6 is a flowchart illustrating yet another example of a spectrum measuring method, according to embodiments.

FIG. 6 is a diagram illustrating yet another example of a spectrum measuring method, according to embodiments. The spectrum measuring method of FIG. 6 may be a method performed by the spectrum measuring apparatuses 100 and 200 of FIGS. 1 and 2. Here, operations 610 and 630 are the same as the operations 410 and 420 respectively, such that detailed description thereof will be omitted.

Referring to FIG. 6, the spectrum measuring apparatus may determine whether the photodetector is saturated in operation 620 based on the measured intensity of the photodetector that is measured in the operation 610; and upon determining that the photodetector is saturated, the spectrum measuring apparatus may adjust gain of the photodetector in operation 640. Further, upon determining in the operation 620 that the photodetector is not saturated, the spectrum measuring apparatus may proceed to the operation 630 to obtain the spectrum of an object by using the measured intensity of the photodetector that is measured in the operation 610.

Figure 7:
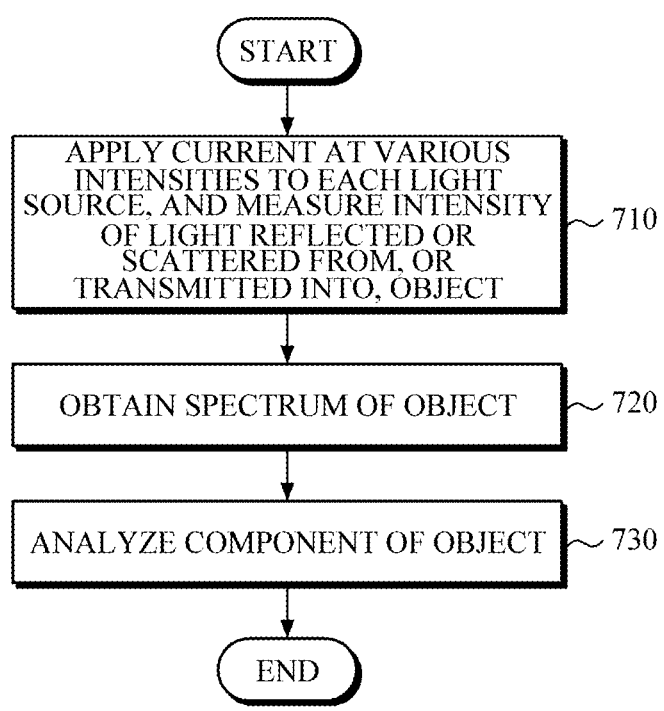
FIG. 7 is a flowchart illustrating an example of a component analyzing method, according to embodiments.

FIG. 7 is a diagram illustrating an example of a component analyzing method, according to embodiments. The component analyzing method of FIG. 7 may be performed by the component analyzing apparatus 300 of FIG. 3.

Referring to FIG. 7, the component analyzing apparatus may emit light onto an object by applying current at various intensities to each of a plurality of light sources that emit light of different wavelengths, and may measure the intensity of light reflected or scattered from, or transmitted into, the object in operation 710.

The component analyzing apparatus may obtain spectrum of the object based on the measured intensity in operation 720, which is measured by applying current at various intensities to each of the light sources.

The component analyzing apparatus may analyze a component of the object by analyzing the obtained spectrum of the object in operation 730. In this case, the component may vary depending on the types of object. For example, the component analyzing apparatus may analyze components of the object using an absorption spectrum analysis method.

In embodiments, the component analyzing apparatus may identify the object based on the analyzed component, and may determine physical properties of the identified object.

Figure 8:
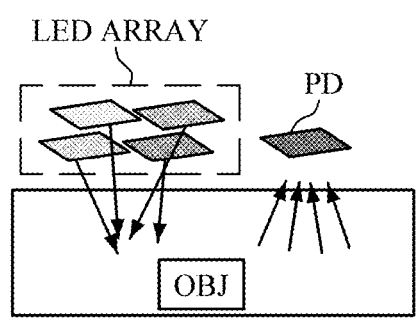
FIG. 8 is a diagram illustrating an example of an LED-PD structure, according to embodiments.

FIG. 8 is a diagram illustrating an example of an LED-PD structure, according to embodiments. The LED-PD structure of FIG. 8 may be an example of a structure of the light source part 110 and the photodetector 120 of FIG. 1.

Referring to FIG. 8, the LED-PD structure may be formed with an LED array of four LEDs and one photo diode (PD). The LEDs may have peak wavelengths of $\lambda_1$, $\lambda_2$, $\lambda_3$, and $\lambda_4$ respectively, which may be changed according to the intensity of the applied current. Here, $\lambda_1$ may be an infrared wavelength, $\lambda_2$ may be a red wavelength, $\lambda_3$ may be a green wavelength, and $\lambda_4$ may be a blue wavelength.

The LEDs may be driven sequentially according to a predetermined control signal and the applied current to emit light of a peak wavelength, corresponding to the applied current, onto the object OBJ; and the photo diode (PD) may detect light returning from the object OBJ.

As illustrated in FIG. 8, the photo diode (PD) may be disposed on the outside of the LED array.

Although FIG. 8 illustrates an example in which the LEDs are four in number, this is an example and the number of LEDs is not limited thereto.

Figure 9:
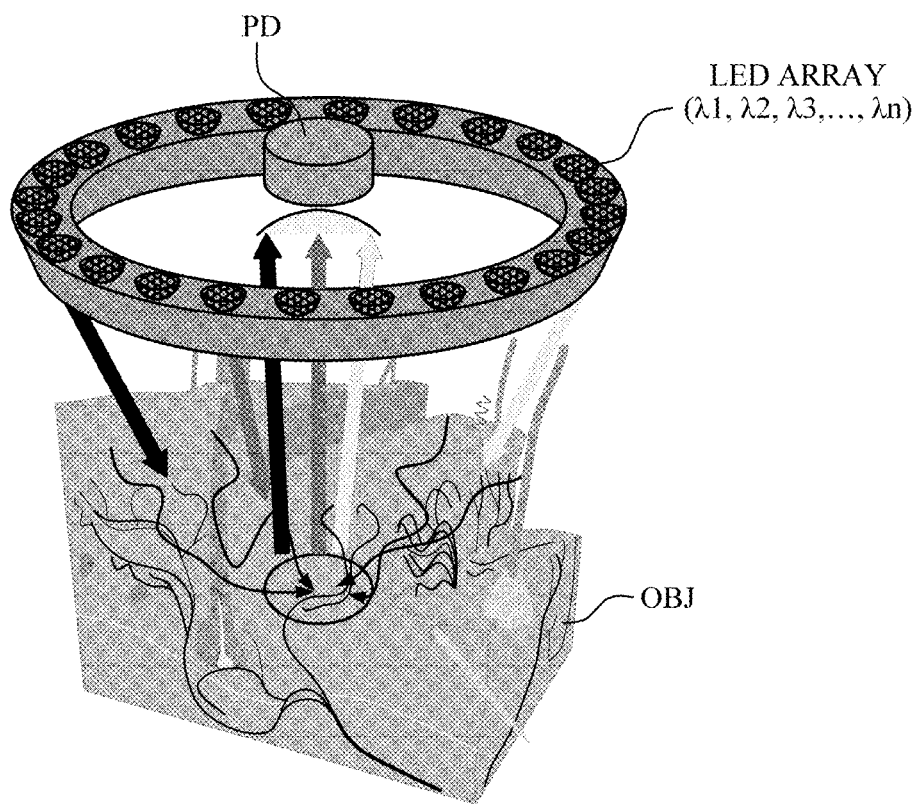
FIG. 9 is a diagram illustrating another example of an LED-PD structure, according to embodiments.

FIG. 9 is a diagram illustrating another example of an LED-PD structure, according to embodiments. The LED-PD structure of FIG. 9 may be an example of a structure of the light source part 110 and the photodetector 120 of FIG. 1.

Referring to FIG. 9, the LED-PD structure may be formed with an LED array of N number of LEDs and one photo diode (PD). The LEDs may have peak wavelengths of $\lambda_1$, $\lambda_2$, $\lambda_3$, . . . , and $\lambda_n$ respectively, which may be changed according to the intensity of the applied current.

The LEDs may be driven sequentially according to a predetermined control signal and the applied current to emit light of a peak wavelength, corresponding to the applied current, onto the object OBJ; and the photo diode (PD) may detect light returning from the object OBJ.

As illustrated in FIG. 9, the LED array may be disposed on the outside of the photo diode (PD) to surround the photo diode (PD). For example, the LED array may be disposed in the form of a concentric circle centered on the photo diode (PD) to surround the photo diode (PD).

The disclosure can be realized as a computer-readable code written on a non-transitory computer-readable recording medium. Codes and code segments for realizing the disclosure can be easily deduced by computer programmers of ordinary skill in the art. The computer-readable recording medium may be any type of recording device in which data is stored in a computer-readable manner. Examples of the computer-readable recording medium include a ROM, a RAM, a CD-ROM, a magnetic tape, a floppy disc, an optical disk, and the like. Further, the computer-readable recording medium can be distributed over a plurality of computer systems connected to a network so that a computer-readable recording medium is written thereto and executed therefrom in a decentralized manner.

Inventive concepts have been described herein with regard to the embodiments. However, it will be obvious to those skilled in the art that various modifications can be made without departing from the gist of the embodiments. Therefore, it is to be understood that the scope of the inventive concepts is not limited to the above-mentioned embodiments, but is intended to include various modifications and equivalents included within the spirit and scope of the appended claims.

What is claimed is:
1. A spectrum measuring apparatus comprising:
   a plurality of light sources configured to emit light of different wavelengths onto an object, based on current at various intensities that is applied to each of the plurality of light sources;
   a photodetector configured to:
      receive light that is reflected from or scattered from the object onto which the light is emitted; and
      measure an intensity of the received light; and
   a processor configured to obtain spectrum of the object, based on the measured intensity of the received light, wherein the processor is further configured to obtain the spectrum of the object by reconstructing the spectrum based on the measured intensity of the received light and a light source spectrum.

2. The spectrum measuring apparatus of claim 1, further comprising a driving current controller configured to control the various intensities of the current applied to each of the plurality of light sources, based on a control signal that is received from the processor.

3. The spectrum measuring apparatus of claim 1, wherein the processor is further configured to adjust a gain of the photodetector so that the photodetector is not saturated.

4. The spectrum measuring apparatus of claim 3, wherein the processor is further configured to:
identify whether the photodetector is saturated, based on the measured intensity of the received light; and
based on the photodetector being identified to be saturated, adjust the gain of the photodetector.

5. The spectrum measuring apparatus of claim 1, wherein the light source spectrum is a spectrum of light that is emitted by each of the plurality of light sources when the current at the various intensities is applied to each of the plurality of light sources.

6. The spectrum measuring apparatus of claim 1, wherein the processor is further configured to obtain the light source spectrum from an internal or external database, or by applying the current at the various intensities to each of the plurality of light sources and measuring an intensity of the light emitted by the plurality of light sources.

7. A spectrum measuring method comprising:
applying current at various intensities to each of a plurality of light sources to emit light of different wavelengths onto an object;
receiving, by a photodetector, light that is reflected from or scattered from the object onto which the light is emitted;
measuring, by the photodetector, an intensity of the received light; and
obtaining spectrum of the object, based on the measured intensity of the received light,
wherein the obtaining of the spectrum of the object comprises obtaining the spectrum of the object by reconstructing the spectrum based on the measured intensity of the received light and a light source spectrum.

8. The spectrum measuring method of claim 7, further comprising adjusting a gain of a photodetector so that the photodetector is not saturated.

9. The spectrum measuring method of claim 8, wherein the adjusting of the gain of the photodetector comprises:
identifying whether the photodetector is saturated, based on the measured intensity of the received light; and
based on the photodetector being identified to be saturated, adjusting the gain of the photodetector.

10. The spectrum measuring method of claim 7, wherein the light source spectrum is a spectrum of light that is emitted by each of the plurality of light sources when the current at the various intensities is applied to each of the plurality of light sources.

11. The spectrum measuring method of claim 10, further comprising obtaining the light source spectrum.

12. The spectrum measuring method of claim 11, wherein the obtaining of the light source spectrum comprises obtaining the light source spectrum from an internal or external database, or by applying the current at the various intensities to each of the plurality of light sources and measuring an intensity of the light emitted by the plurality of light sources.

13. A component analyzing apparatus comprising:
a spectrum measurer configured to obtain spectrum of an object; and
a first processor configured to analyze a component of the object by analyzing the obtained spectrum of the object,
wherein the spectrum measurer comprises:
a plurality of light sources configured to emit light of different wavelengths onto the object, based on current at various intensities that is applied to each of the plurality of light sources;
a photodetector configured to:
receive light that is reflected from or scattered from the object onto which the light is emitted; and
measure an intensity of the received light; and
a second processor configured to obtain the spectrum of the object, based on the measured intensity of the received light,
wherein the second processor is further configured to obtain the spectrum of the object by reconstructing the spectrum based on the measured intensity of the received light and a light source spectrum.

* * * * *